United States Patent
BuGubaia et al.

(10) Patent No.: US 11,242,730 B2
(45) Date of Patent: Feb. 8, 2022

(54) HYDROCARBON FLOWLINE CORROSION INHIBITOR OVERPRESSURE PROTECTION

(71) Applicant: Saudi Arabian Oil Company, Dhahran (SA)

(72) Inventors: Fathi BuGubaia, Mubarraz (SA); Khalid Al Ghamdi, Dhahran (SA); Mohammad R. Khunaizi, Dammam (SA); Rashid D. Al Hajri, Abqaiq (SA); Khalid Al Subaie, Dammam (SA); Zayed Qahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/158,836

(22) Filed: Jan. 26, 2021

(65) Prior Publication Data

US 2021/0148193 A1    May 20, 2021

Related U.S. Application Data

(62) Division of application No. 16/225,571, filed on Dec. 19, 2018, now Pat. No. 11,002,111.

(51) Int. Cl.
*E21B 37/06* (2006.01)
*F16K 17/16* (2006.01)
(Continued)

(52) U.S. Cl.
CPC .............. *E21B 37/06* (2013.01); *F16K 17/16* (2013.01); *E21B 34/066* (2013.01);
(Continued)

(58) Field of Classification Search
None
See application file for complete search history.

(56) References Cited

U.S. PATENT DOCUMENTS 2,353,191 A    7/1944   Samiran
2,594,951 A    4/1952   Mancini
(Continued)

FOREIGN PATENT DOCUMENTS

GB          836387          6/1960
JP          2004321860      11/2004
WO          WO 2013070805   5/2013

OTHER PUBLICATIONS

PCT International Search Report and Written Opinion in International Appln. No. PCT/US2019/066576 dated Apr. 3, 2020, 13 pages.

(Continued)

*Primary Examiner* — Charles R Nold
(74) *Attorney, Agent, or Firm* — Fish & Richardson P.C.

(57) ABSTRACT

The disclosure describes hydrocarbon flowline corrosion inhibitor overpressure protection. Such a protection system includes a fluid flow pathway fluidically coupled to a corrosion inhibitor injection pump that injections corrosion inhibitor into a hydrocarbon carrying flowline. When the injection pump pressure exceeds a threshold flow pressure, the corrosion inhibitor is flowed through a first branch of the fluid flow pathway to relieve the excess pressure. The first branch is fluidically isolated from a second branch. When a rupture disc in the first branch fails, then the corrosion inhibitor is diverted to flow through the second branch and the first branch is isolated from the corrosion inhibitor flow.

7 Claims, 2 Drawing Sheets

(51) Int. Cl.
*E21B 34/06* (2006.01)
*F16K 15/06* (2006.01)
*F16K 17/168* (2006.01)
*F16K 27/10* (2006.01)
*G21C 9/008* (2006.01)

(52) U.S. Cl.
CPC .......... *F16K 15/063* (2013.01); *F16K 17/168* (2013.01); *F16K 27/102* (2013.01); *G21C 9/008* (2013.01)

(56) References Cited

U.S. PATENT DOCUMENTS

| | | | |
|---|---|---|---|
| 2,691,773 | A | 10/1954 | Lichtenberger |
| 2,788,795 | A * | 4/1957 | Eichenauer ............. B60S 5/046 137/224.5 |
| 2,878,828 | A | 3/1959 | Klafstad |
| 3,027,916 | A | 4/1962 | Smith |
| 3,393,702 | A | 7/1968 | Ferrill |
| 3,702,142 | A | 11/1972 | Richardson |
| 4,098,765 | A * | 7/1978 | Kays ................. C08G 16/0293 264/124 |
| 4,130,130 | A | 12/1978 | Stewart et al. |
| 4,263,929 | A | 4/1981 | Kearney |
| 4,270,560 | A | 6/1981 | Kearney |
| 4,634,099 | A | 1/1987 | Danko et al. |
| 4,635,723 | A | 1/1987 | Spivey |
| 4,961,441 | A | 10/1990 | Salter |
| 5,125,621 | A | 6/1992 | Parsons et al. |
| 5,341,839 | A | 8/1994 | Kobayashi et al. |
| 5,501,242 | A | 3/1996 | Coutts et al. |
| 5,583,490 | A * | 12/1996 | Santos .................... F16K 17/16 137/557 |
| 5,950,923 | A | 9/1999 | Fukano et al. |
| 6,029,903 | A | 2/2000 | Fukano et al. |
| 6,131,599 | A * | 10/2000 | DeGood ............. F16K 17/1626 137/68.27 |
| 6,981,553 | B2 | 1/2006 | Stegemeier et al. |
| 7,445,163 | B2 | 11/2008 | Fukano et al. |
| 8,644,996 | B2 | 2/2014 | Inagaki |
| 8,955,821 | B2 | 2/2015 | Okuda et al. |
| 9,803,763 | B2 | 10/2017 | Zikeli et al. |
| 10,527,183 | B1 * | 1/2020 | Hill ........................ F16K 17/40 |
| 2011/0001070 | A1 | 1/2011 | Wilke |
| 2011/0040501 | A1 | 2/2011 | Martin et al. |
| 2012/0305262 | A1 | 12/2012 | Ballard et al. |
| 2014/0048255 | A1 | 2/2014 | Baca et al. |
| 2014/0238512 | A1 | 8/2014 | Bowers |
| 2015/0240601 | A1 * | 8/2015 | Woodford ............... E21B 34/10 166/305.1 |
| 2017/0285668 | A1 * | 10/2017 | Moseley ............. G05D 16/2093 |
| 2017/0307095 | A1 | 10/2017 | Wilson et al. |
| 2017/0314694 | A1 | 11/2017 | Moro-Le Gall et al. |
| 2018/0313459 | A1 * | 11/2018 | Lucidera ............. F16K 11/0708 |

OTHER PUBLICATIONS

PCT International Search Report and Written Opinion in International Appln. No. PCT/US2020/019883, dated Jun. 4, 2020, 12 pages.

Process Safety Beacon, "Pressure-Relief Valvu Bonnets—To Plug or Not To Plug?" An ICHE Technology Alliance, Center for Chemical Process Safety, ioMosaic, May 2013, 1 pages.

GCC Examination Report in Gulf Cooperation Council Appln. No. GC 2019-38865, dated Jun. 30, 2021, 5 pages.

* cited by examiner

HYDROCARBON FLOWLINE CORROSION INHIBITOR OVERPRESSURE PROTECTION

CROSS-REFERENCE TO RELATED APPLICATIONS

This application is a divisional of and claims the benefit of U.S. application Ser. No. 16/225,571, filed on Dec. 19, 2018, the entire contents of which are incorporated by reference in its entirety

TECHNICAL FIELD

This disclosure relates to managing flow of hydrocarbons through flowlines that carry hydrocarbons between geographic locations.

BACKGROUND

Hydrocarbons (for example, petroleum, crude oil, natural gas or combinations of them) that are entrapped in subterranean zones can be extracted from those zones and lifted to the surface, for example, through production wells. The extracted hydrocarbons can be flowed from the extraction site to processing plants (for example, gas-oil separation plants) through flowlines. Processed hydrocarbons can further be flowed from the processing plants to other geographic locations (for example, delivery sites) using pipelines. Corrosive nature of certain hydrocarbons can induce corrosion in the flowlines that carry those hydrocarbons.

SUMMARY

This specification describes technologies relating to hydrocarbon flowline corrosion inhibitor overpressure protection.

Certain aspects of the subject matter described here can be implemented as a corrosion inhibitor injection system. The system includes a corrosion inhibitor injection pump configured to flow a corrosion inhibitor into a flowline through which hydrocarbons are flowed. The corrosion inhibitor is configured to inhibit corrosion of the flowline due to the flow of the hydrocarbons. The corrosion inhibitor injection pump is configured to flow the corrosion inhibitor at a pressure greater than a flowline pressure of the hydrocarbons flowing through the flowline. The system includes a fluid flow pathway fluidically coupled to the corrosion inhibitor injection pump. The corrosion inhibitor injection pump is configured to flow the corrosion inhibitor through the fluid flow pathway when a corrosion inhibitor injection pump pressure exceeds a threshold flow pressure. The system includes a first rupture disc fluidically coupled to the fluid flow pathway and to the corrosion inhibitor injection pump. The first rupture disc is configured to fail in response to a pressure at which the corrosion inhibitor injection pump flows the corrosion inhibitor into the flowline exceeding a first rupture disc threshold pressure. The system includes a second rupture disc fluidically coupled to the fluid flow pathway and to the corrosion inhibitor injection pump. The second rupture disc is isolated from flow of the corrosion inhibitor when the first rupture disc is fluidically coupled to the corrosion inhibitor injection pump. The system includes a processing system configured to perform operations. The operations include determining that the first rupture disc has failed. In response to determining that the first rupture disc has failed, the operations include fluidically isolating the first rupture disc from the flow of the corrosion inhibitor, and fluidically coupling the second rupture disc to the corrosion inhibitor injection pump.

Aspects of the disclosure combinable with any of the other aspects include the following features. The system includes a first block valve fluidically coupled to the fluid flow pathway and the first rupture disc. The first block valve is coupled to the processing system. The first block valve is configured to be in an open state to permit the corrosion inhibitor injection pump to flow the corrosion inhibitor through the fluid flow pathway. The processing system is configured to change the first block valve from the open state to a closed state in response to determining that the first rupture disc has failed.

Aspects of the disclosure combinable with any of the other aspects include the following features. The system includes a second block valve fluidically coupled to the fluid flow pathway and the second rupture disc. The second block valve is coupled to the processing system. The second block valve is configured to be in a closed state when the second rupture disc is isolated from the flow of the corrosion inhibitor. The processing system is configured to change the second block valve from the closed state to the open state in response to determining that the first rupture disc has failed.

Aspects of the disclosure combinable with any of the other aspects include the following features. The processing system is connected to an isolation valve upstream of the flowline compared to the corrosion inhibitor injection system. In response to determining that the first rupture disc has failed, the processing system is configured to determine that a time between fluidically isolating the first rupture disc from the flow of the corrosion inhibitor and fluidically coupling the second rupture disc to the corrosion inhibitor injection pump exceeds a time threshold. In response, the processing system is configured to transmit a closure signal to the isolation valve to cause the isolation valve to cease flow through the flowline.

Aspects of the disclosure combinable with any of the other aspects include the following features. In response to determining that the first rupture disc has failed, the processing system is configured to cause the corrosion inhibitor injection pump to flow the corrosion inhibitor at a pressure less than the threshold pressure.

Aspects of the disclosure combinable with any of the other aspects include the following features. The system includes an alarm system coupled to the processing system. The alarm system is configured to transmit one or more electronic alerts to one or more electronic terminals to communicate that the first rupture disc has failed.

Aspects of the disclosure combinable with any of the other aspects include the following features. The system includes a first pressure sensor operatively coupled to the first rupture disc and the processing system. The first pressure sensor is configured to sense the pressure at which the corrosion inhibitor injection pump flows the corrosion inhibitor into the fluid flow pathway and to transmit the sensed pressure to the processing system.

Aspects of the disclosure combinable with any of the other aspects include the following features. The system includes a second pressure sensor operatively coupled to the second rupture disc and the processing system. In response to the second pressure sensor being fluidically coupled to the corrosion inhibitor injection pump, the second pressure sensor is configured to sense a pressure at which the corrosion inhibitor injection pump flows the corrosion inhibitor into the fluid flow pathway and to transmit the sensed pressure to the processing system.

Aspects of the disclosure combinable with any of the other aspects include the following features. The second rupture disc is configured to fail in response to the pressure at which the corrosion inhibitor injection pump flows the corrosion inhibitor into the flowline exceeding a second rupture disc threshold pressure.

Aspects of the disclosure combinable with any of the other aspects include the following features. The first pressure threshold and the second pressure threshold are different from each other.

Certain aspects of the subject matter described here can be implemented as a method. A corrosion inhibitor injection pump flows a corrosion inhibitor into a flowline through which hydrocarbons are flowed at a pressure greater than a flowline pressure of the hydrocarbons flowing through the flowline. The corrosion inhibitor is configured to inhibit corrosion of the flowline due to the flow of the hydrocarbons. Based on a failure of a rupture disc in a first branch of a flow pathway through which the corrosion inhibitor flows, it is determined that a pressure at which the corrosion inhibitor is flowed into the flowline exceeds a threshold pressure. In response to determining that the pressure exceeds the threshold pressure, flow of the corrosion inhibitor through the first branch is ceased and flow of the corrosion inhibitor is permitted in a second branch of the flow pathway which is fluidically isolated from the first branch at a pressure less than the threshold pressure. One or more electronic alerts are transmitted to one or more electronic terminals to communicate that the pressure exceeds the threshold pressure.

Aspects of the disclosure combinable with any of the other aspects include the following features. To cease flow of the corrosion inhibitor in the first branch, a first block valve coupled to the first branch is changed from an open state to a closed state.

Aspects of the disclosure combinable with any of the other aspects include the following features. To permit the flow of the corrosion inhibitor in the second branch, a second block valve coupled to the second branch is changed from a closed state to an open state.

Aspects of the disclosure combinable with any of the other aspects include the following features. It is determined that a time between ceasing the flow of the corrosion inhibitor in the first branch and permitting the flow of the corrosion inhibitor in the second branch exceeds a time threshold. In response, a closure signal is transmitted to an isolation valve upstream of the flowline to cause the isolation valve to cease flow through the flowline.

Aspects of the disclosure combinable with any of the other aspects include the following features. In response to determining that the pressure exceeds the threshold pressure, the corrosion inhibitor injection pump is caused to flow the corrosion inhibitor at the pressure less than the threshold pressure.

Aspects of the disclosure combinable with any of the other aspects include the following features. A pressure on the rupture disc in the first branch due to flow of the corrosion inhibitor is sensed, and it is determined that the rupture disc has failed in response to the pressure downstream of the rupture disc.

Aspects of the disclosure combinable with any of the other aspects include the following features. The rupture disc is a first rupture disc. Pressure on a second rupture disc in the second branch due to flow of the corrosion inhibitor is sensed.

Certain aspects of the subject matter described here can be implemented as a corrosion inhibitor injection system. The system includes a corrosion inhibitor flow control system that includes a corrosion inhibitor injection pump, a first fluid flow pathway and a second fluid flow pathway. The corrosion inhibitor injection pump is configured to flow a corrosion inhibitor into a flowline through which hydrocarbons are flowed. The corrosion inhibitor is configured to inhibit corrosion of the flowline due to the flow of the hydrocarbons. The corrosion inhibitor injection pump is configured to flow the corrosion inhibitor at a pressure greater than a flowline pressure of the hydrocarbons flowing through the flowline. The first fluid flow pathway is fluidically coupled to the corrosion inhibitor injection pump. The corrosion inhibitor injection pump is configured to flow the corrosion inhibitor through the first fluid flow pathway when a corrosion inhibitor injection pump pressure exceeds a threshold flow pressure. The first fluid flow pathway is fluidically coupled to a first rupture disc configured to fail in response to a pressure of the flow of the corrosion inhibitor in the first fluid pathway exceeding a first pressure threshold. The second fluid flow pathway is fluidically coupled to the corrosion inhibitor injection pump. The corrosion inhibitor injection pump is configured to flow the corrosion inhibitor through the second fluid flow pathway when the corrosion inhibitor injection pump pressure exceeds the threshold flow pressure. The second fluid flow pathway is fluidically coupled to a second rupture disc configured to fail in response to a pressure of the flow of the corrosion inhibitor in the second fluid pathway exceeding a second pressure threshold The first fluid pathway and the second fluid flow pathway are fluidically isolated from each other such that when the first fluid pathway is open to flow the corrosion inhibitor fluid to the flowline, the second fluid pathway is closed to flow the corrosion inhibitor fluid to the flowline. The system includes a processing system coupled to the corrosion inhibitor flow control system, the first fluid flow pathway and the second fluid flow pathway. The processing system is configured to determine a failure of the first rupture disc, cease the flow of the corrosion inhibitor through the first fluid pathway, and permit the flow of the corrosion inhibitor through the second fluid pathway.

Aspects of the disclosure combinable with any of the other aspects include the following features. The processing system is configured to determine that a time to cease the flow of the corrosion inhibitor through the first fluid pathway and to permit the flow of the corrosion inhibitor through the second fluid pathway exceeds a time threshold, and in response to determining that the time exceeds the time threshold, transmitting a closure signal to cease flow through the flowline.

The details of one or more implementations of the subject matter described in this specification are set forth in the accompanying drawings and the description that follows. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Oil and gas flowlines are often protected by corrosion inhibitors that are injected downstream of production wellheads. Different corrosion inhibitors serve different functions, for example, oxygen scavenging, neutralizing and establishing a physical barrier at the internal surface of the flowlines to mitigate internal corrosion, to name a few. This disclosure describes a corrosion inhibitor injection overpressure protection system for a hydrocarbon flowline. As described later, the system includes rupture discs in the flow paths of the corrosion inhibitors to the flowline, to protect the corrosion inhibitor piping system from overpressure. The rupture discs are connected to a logic solver which, upon receiving a signal indicating failure of a rupture disc, can control operations such as diverting flow of the corrosion inhibitor into an alternative flow path, modifying operation of the corrosion inhibitor injection pumps, triggering flowline isolation valves or other operations. By flowing the corrosion inhibitor through the alternative overpressure protection path, repair or replacement of the failed rupture disc can be implemented without ceasing the flow of the corrosion inhibitor into the flowline, for long period. In this manner, the technical operation of inhibitor corrosion overpressure protection system for flowlines can be improved and optimized. Implementing the techniques described in this disclosure can negate the need for periodic maintenance or replacement of the conventional spring loaded relief valves, thereby decreasing maintenance cost and man-hours for the same since the wellheads and inhibitor injection systems are typically scattered in field remote areas yielding high transportation, maintenance and man-hour costs.

Figure 1:
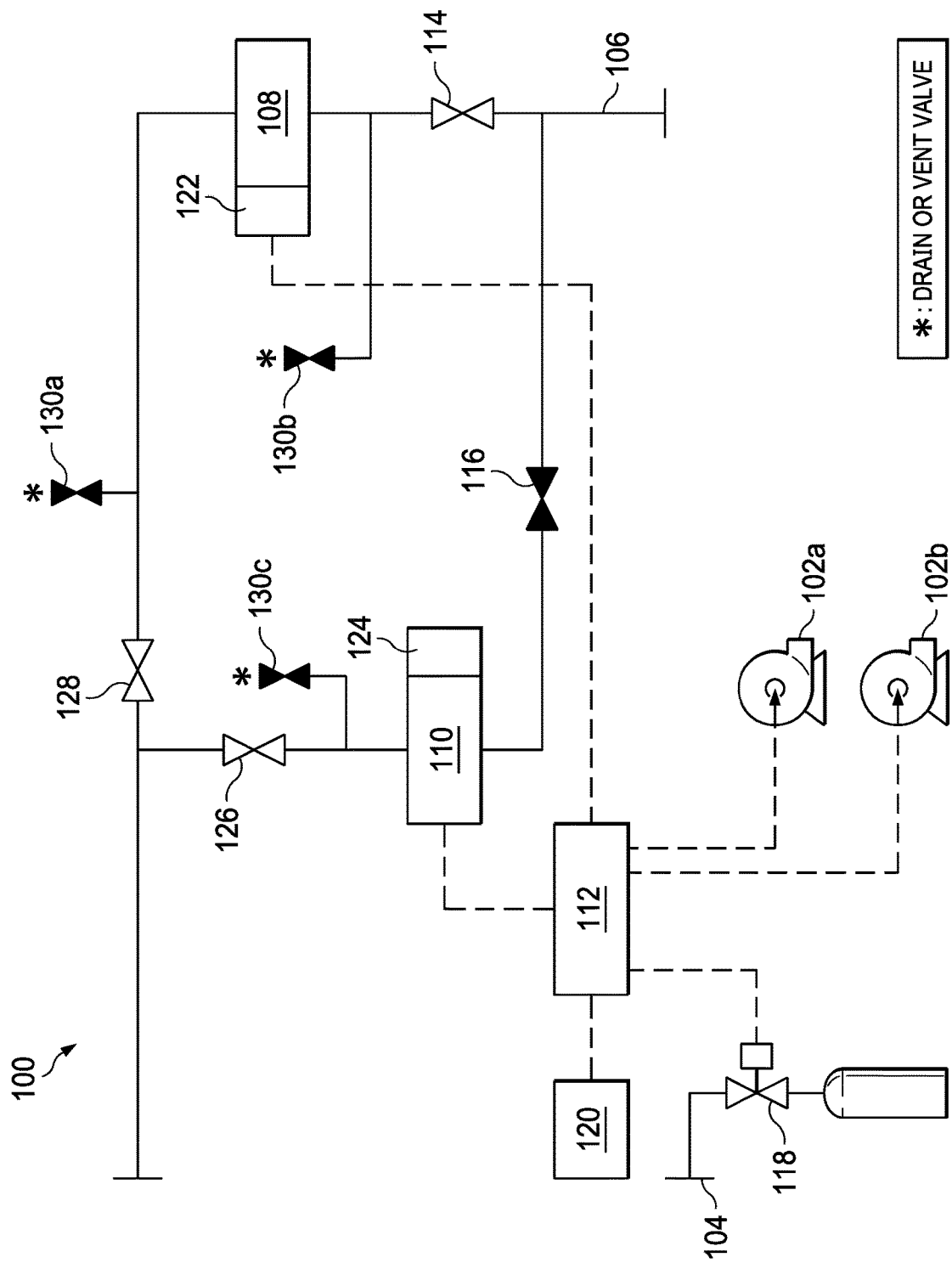
FIG. 1 is a schematic diagram of an overpressure protection of a hydrocarbon corrosion inhibitor injection system.

FIG. 1 is a schematic diagram of an overpressure protection of a hydrocarbon corrosion inhibitor injection system 100. The system 100 includes one or more corrosion inhibitor injection pumps (for example, a first pump 102a, a second pump 102b), each configured to flow a corrosion inhibitor into a flowline 104 through which hydrocarbons are flowed. The corrosion inhibitor is configured to inhibit corrosion of the flowline 104 due to the flow of the corrosive hydrocarbons. The pump is configured to flow the corrosion inhibitor at a pressure greater than a flowline pressure of the hydrocarbons flowing through the flowline 104. By doing so, the pump can overcome the flowline pressure and inject the corrosion inhibitor into the flowline. The flowline pressure is variable depending on the production demand. Corrosion inhibitor pressure can be higher than flowline pressure, for example, by at least 4-10 pounds per square inch (psi). The system 100 includes a corrosion inhibitor overpressure protection system. When a pressure of the corrosion inhibitor injection pumps exceeds a threshold pressure (that is, threshold flow pressure or threshold corrosion fluid flow pressure), then the overpressure protection system diverts excess pressure greater than the threshold pressure to a blowdown, thereby relieving the excess pressure without overpressurizing the system 100.

A fluid flow pathway 106 is fluidically coupled to each of the corrosion inhibitor injection pumps and the corrosion inhibitor overpressure protection system. The pumps are configured to flow the corrosion inhibitor into the flowline 104 and through the fluid flow pathway 106. In the context of this disclosure, the fluid flow pathway includes one or more hollow pipes, pipe joints and associated flow components (seals, valves, and the like) interconnecting the various components described in this disclosure. For example, one or more pipes or a network of pipes fluidically couple the pumps to the flowline 104. The pipes are configured to flow the corrosion inhibitor at pressures delivered by the one or more pumps.

A first rupture disc 108 is fluidically coupled to the fluid flow pathway 106 and to the one or more corrosion inhibitor injection pumps. The first rupture disc 108 is configured to fail (that is, burst) if a pressure (first rupture disc threshold pressure) at which the corrosion inhibitor injection pump flows the corrosion inhibitor into the pathway 106 exceeds a threshold pressure. A rupture disc is an overpressure control member that includes a membrane that can withstand a pressure up to the threshold pressure. If the pressure exceeds the threshold pressure, the membrane fails, that is, bursts. The pressure experienced by the rupture disc can increase until the threshold pressure is reached. Once the membrane fails, the pressure experienced by the rupture disc decreases rapidly indicating failure. FIG. 1 shows the first rupture disc 108 fluidically coupled to the fluid flow pathway 106 to sense a pressure of flow of the corrosion inhibitor through the fluid flow pathway 106. In some implementations, a first pressure sensor 122 can be operatively coupled to the first rupture disc 108 and to a logic solver 112 described later. The first pressure sensor 122 can sense a pressure experienced downstream of the first rupture disc 108 and transmit the sensed pressure to the logic solver 112.

A second rupture disc 110 is fluidically coupled to the fluid flow pathway 106 and to the one or more corrosion inhibitor injection pumps. The second rupture disc 110 can be similar in construction and operation as the first rupture disc 108 and be associated with a second rupture disc threshold pressure at which the second rupture disc 110 is configured to fail (that is, burst). The threshold pressures for the two rupture discs can be the same or can be different. In some implementations, a second pressure sensor 124 can be operatively coupled to the second rupture disc 110 and to the logic solver 112. The second pressure sensor 124 can sense a pressure downstream of the second rupture disc 110 and transmit the sensed pressure to the logic solver 112.

The second rupture disc 110 is fluidically isolated from the flow of the corrosion inhibitor when the first rupture disc 108 is fluidically coupled to the corrosion inhibitor injection pumps. For example, the fluid flow pathway 106 can be divided into two branches with the first rupture disc 108 being in a first branch and the second rupture disc 110 being in a second branch. The two branches are fluidically isolated during operation in that, at any given time, the pump can flow the corrosion inhibitor through either the first branch or the second branch but not both branches. Because each rupture disc is in one of the branches, at any given time, flow of the corrosion inhibitor applies a pressure on only one of the two rupture discs.

In some implementations, the first branch into which the fluid flow pathway 106 is divided can be a first flow pathway that includes the first rupture disc 108 and a first block valve 114 that is fluidically coupled to the first rupture disc 108. The first block valve 114 can be in an open state to permit the one or more corrosion inhibitor pumps to flow the corrosion inhibitor through the first fluid flow pathway. In response to a signal, the first block valve 114 can be changed to a closed state in which the first block valve 114 can prevent the one or more corrosion inhibitor pumps from flowing the corrosion inhibitor through the first fluid flow pathway. Similarly, the second branch into which the fluid flow pathway 106 is divided can be a second flow pathway that includes the second rupture disc 108 and a second block valve 116 that is fluidically coupled to the second rupture disc 110. The second block valve 116 can be in an open state to permit the one or more corrosion inhibitor pumps to flow the corrosion inhibitor through the second fluid flow pathway. In response to a signal, the second block valve 116 can be changed to a closed state in which the second block valve 116 can prevent the one or more corrosion inhibitor pumps from flowing the corrosion inhibitor through the second fluid flow pathway. At any given time, either the first block valve 114 or the second block valve 116 is open and the other is closed such that the corrosion inhibitor fluid can be pumped through either the first flow pathway or the second flow pathway but not both.

The logic solver 112 is connected to the one or more corrosion inhibitor injection pumps, the fluid flow pathway 106 and the fluidic components in the pathway. In some implementations, the logic solver 112 is a processing system that can be implemented as one or more computer systems, each including a computer-readable medium (for example, a non-transitory computer-readable medium) and one or more processors each storing computer instructions executable by the computer-readable medium to perform operations described in this disclosure. Alternatively or in addition, the logic solver 112 can be implemented as processing circuitry. In an example scenario in which the first fluid flow pathway is open to flow of the corrosion inhibitor and the second fluid flow pathway is closed, the logic solver 112 can determine that the first rupture disc 108 has failed. In response, the logic solver 112 can fluidically isolate the first fluid flow pathway from the flow of the corrosion inhibitor and fluidically permit the flow instead and only through the second fluid flow pathway.

The logic solver 112 can automatically and without user intervention perform multiple operations to manage the flow of the corrosion inhibitor from the one or more pumps into the flowline 104. For example, a failure of the first rupture disc 108 indicates that a pressure in the corrosion inhibitor injection system 100 has exceeded a threshold pressure (for example, a safe pressure threshold). If the corrosion inhibitor continues to flow even after the first rupture disc 108 fails, then the corrosion injection system 100 can experience an improper operation due to the drop in pump discharge pressure and inability to inject the inhibitor to the flowlines. To prevent such a situation, the logic solver 112 can prevent flow through the first fluid pathway (for example, by changing the first block valve 114 to a closed state) and can permit flow through the second fluid pathway (for example, by changing the second block valve 116 to an open state).

In some implementations, the logic solver 112 can be coupled to an alarm system 120 that can transmit one or more electronic alerts to one or more electronic terminals (not shown) to communicate that the first rupture disc 108 has failed. For example, the alarm system 120 can include operational terminals monitored by operations personnel or maintenance crews or both. The alarm system 120 can turn on audible or visual alarms or transmit messages (for example, electronic messages) communicating the failure of the first rupture disc 108. In some implementations, the alarm system 12 can turn on the audible or visual alarms or transmit messages (or combinations of them) in response to irresponsive or improper actions by the block valves or other system faults during operation, due to overdue system functional testing and checks for the components including the logic solver 112, pressure transmitters or other system components, or combinations of them. In some implementations, the logic solver 112 can turn off the corrosion inhibitor pumps to protect the corrosion inhibitor piping from overpressure when these circumstances arise. An alarm signal may also be sent when the pumps are turned off due to such circumstances.

In some implementations, the logic solver 112 can shut down flow of the hydrocarbon through the flowline 104, in case the corrosion inhibitor injection system is inoperative due to malfunction of overpressure protection system. For example, the hydrocarbons flowed through the flowline 104 can be extracted from a wellbore (not shown) and flowed through a wellhead shown schematically in FIG. 1. An isolation valve 118 can be connected to the wellhead and upstream of the flowline 104 compared to the corrosion inhibitor injection system 100. In an open state, the isolation valve 118 can permit hydrocarbon flow through the flowline 104. In a closed state, the isolation valve 118 can prevent or cease hydrocarbon flow through the flowline 104. Upon determining that the first rupture disc 108 has failed, the logic solver 112 can start a clock (not shown) to measure a time to switch corrosion inhibitor flow from the first fluid flow pathway to the second fluid flow pathway as described earlier. If the time to switch is small, then no significant interruption to the injection of the corrosion inhibitor into the flowline 104 will occur due reverting to the normal corrosion inhibitor operation pressure within a safe reasonable time to protect the flowline by inhibitor. However, if the time to switch flow is large, then a risk of the corrosion in flowline situation increases. In some implementations, the logic solver 112 can transmit a signal to the isolation valve 118 to change from the open state to the closed state if the measured time to switch is greater than a threshold time. When this valve closure signal is transmitted, the solver also turns off the corrosion inhibitor pumps. The threshold time can be a value stored in a computer-readable memory against which the logic solver 112 can compare the measured time. The threshold time can be selected based, in part, on time limits that the flowline 104 without inhibitor injected can withstand.

In some implementations, the logic solver 112 can modify an operation of the corrosion inhibitor injection pumps. For example, the failure of the first rupture disc 108 is an indication that the pressure in the first fluid flow pathway has exceeded a first pressure threshold. One reason for the failure, therefore, can be a speed of the pumps. In such instances, the logic solver 112 can transmit an instruction to the one or more pumps to decrease a rotational speed of the impeller resulting in a decrease in the pressure in the first fluid flow pathway. In some implementations, the logic solver 112 can transmit an instruction to turn off the one or more pumps in response to system malfunctions, as described earlier.

The logic solver 112 can implement the operations described above in each of the first fluid flow pathway or the second fluid flow pathway. For example, as described above, if the first rupture disc 108 fails, then the logic solver 112 can close the first block valve 114 to cease flow through the first fluid flow pathway and open the second block valve 116 to permit flow instead through the second fluid flow pathway. Operations personnel or maintenance crew can repair or replace the first rupture disc 108. In some instances, upon the first rupture disc 108 being repaired or replaced, the logic solver 112 can automatically and without user intervention close the second block valve 116 to cease flow through the second fluid flow pathway and open the first block valve 114 to permit flow instead through the first fluid flow pathway. Alternatively, the logic solver 112 can switch back to the first fluid flow pathway from the second fluid flow pathway in response to user input. In another alternative implementation, the logic solver 112 can automatically and without user intervention switch back to the first fluid flow pathway if the second rupture disc 110 fails.

The first block valve 114 and the second block valve 116 can be upstream valves that are upstream of the first rupture disc 108 and the second rupture disc 110, respectively. In some implementations, the corrosion inhibitor injection overpressure protection system 100 can include a block valve 128 and a block valve 126 in the first fluid flow pathway and the second fluid flow pathway, respectively, that are downstream of the first disc 108 and the second disc 110, respectively. Each of the block valve 128 and the block valve 126 can be in the same state as the first block valve 114 and the second block valve 116, respectively. Having two block valves in a fluid flow pathway branch instead of one can improve the prevention or permission of flow of the corrosion inhibitor through that fluid flow pathway branch to allow for isolation and rupture disc replacement by maintenance crew. In addition, the corrosion inhibitor injection system 100 can include multiple vent or drain valves (for example, vent or drain valves 130a, 130b, 130c, 130d), each of which can be used to reduce the contained pressure and vent or drain the contained fluid in a fluid flow pathway branch to allow for rupture disc replacement by maintenance crew.

Figure 2:
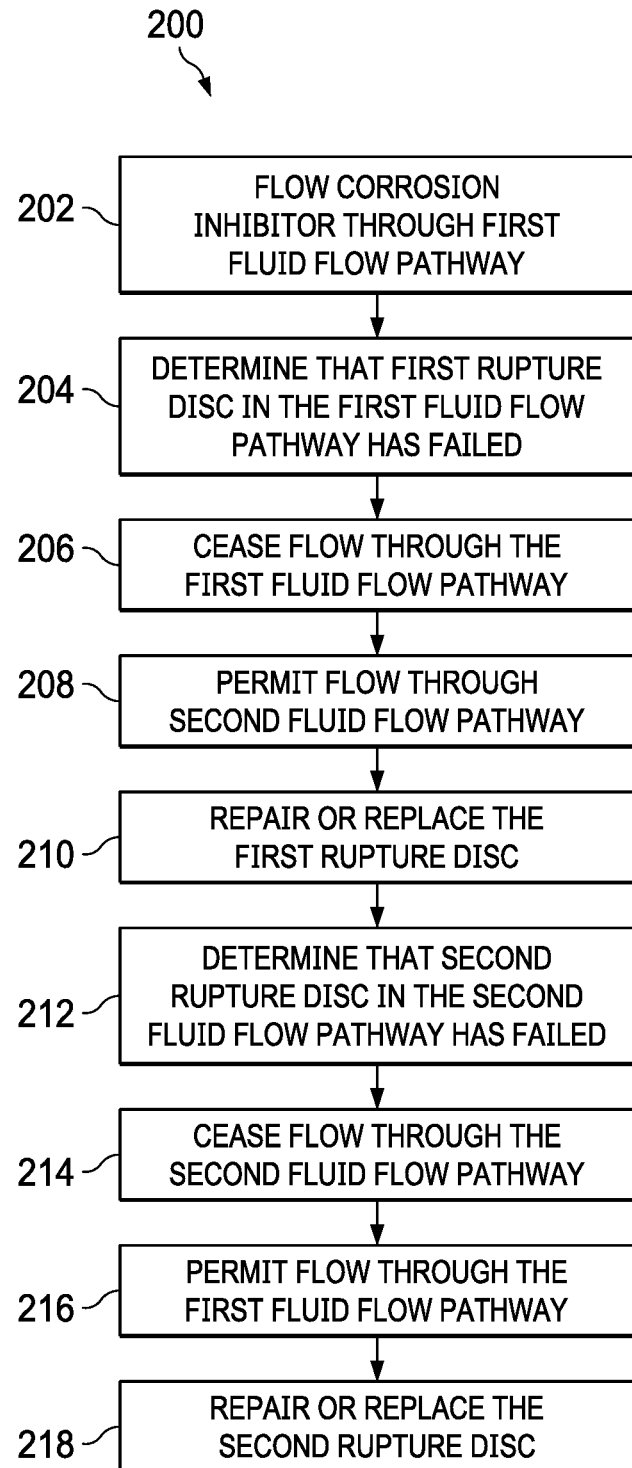
FIG. 2 is a flowchart of an example of a process of operating the hydrocarbon corrosion inhibitor injection system of FIG. 1.

FIG. 2 is a flowchart of an example of a process 200 of operating the hydrocarbon corrosion inhibitor injection overpressure protection system of FIG. 1. Certain portions of the process 200 can be implemented automatically and without user intervention by a processing system, for example, the logic solver 112. Certain portions of the process 200 can be implemented by components of a corrosion inhibitor injection overpressure protection system, for example, system 100. Certain portions of the process 200 can be implemented manually. At 202, corrosion inhibitor is flowed through a first fluid flow pathway. For example, in response to a corrosion injection pump pressure being greater than a threshold flow pressure, some of the corrosion inhibitor can be flowed through the overpressure protection system (for example, the first fluid pathway 106) to relieve the excess pressure. At 204, it is determined that a first rupture disc in the first fluid flow pathway has failed. For example, the logic solver 112 can determine that the first rupture disc 108 has failed based on pressure sensed by the pressure sensor 122 connected to the first rupture disc 108. At 206, flow through the first fluid flow pathway is ceased in response to determining that the first rupture disc has failed. For example, the logic solver 112 can close the first block valve 114 upon determining that the first rupture disc 108 has failed based on received pressure measurements from the pressure sensor 122. At 208, flow through the second fluid flow pathway is permitted. For example, upon closing the first block valve 114, the logic solver 112 can open the second block valve 116 to permit flow of the corrosion inhibitor through the second fluid flow pathway to relieve the excess pressure described earlier. At 210, the first rupture disc can be repaired or replaced. For example, operations personnel or maintenance crew can repair or replace the first rupture disc 108 while the corrosion inhibitor injection overpressure protection continues uninterrupted through the second fluid flow pathway. At 212, it is determined that a second rupture disc in the second fluid flow pathway has failed. For example, the logic solver 112 can determine that the second rupture disc 110 has failed based on pressure sensed by the pressure sensor 124 connected to the second rupture disc 110. At 214, flow through the second fluid flow pathway is ceased in response to determining that the second rupture disc has failed. For example, the logic solver 112 can close the second block valve 116 upon determining that the second rupture disc 110 has failed based on received pressure measurements from the pressure sensor 124. At 216, flow through the first fluid flow pathway is permitted. For example, upon closing the second block valve 116, the logic solver 112 can open the first block valve 114 to permit flow of the corrosion inhibitor through the second fluid flow pathway to relieve the excess pressure described earlier. At 218, the second rupture disc can be repaired or replaced. For example, operations personnel or maintenance crew can repair or replace the second rupture disc 110 while the corrosion inhibitor injection overpressure protection continues uninterrupted through the second fluid flow pathway.

The logic solver 112 can be a component that is connected to a single corrosion inhibitor injection overpressure protection system 100 as described earlier or can be shared by multiple similar injection systems. Each injection system can be implemented to inject a corrosion inhibitor or other fluids into the flowline. For each injection system, the logic solver 112 can store and execute dedicated computer instructions similar to the instructions for the system 100 described earlier.

Thus, particular implementations of the subject matter have been described. Other implementations are within the scope of the following claims.

The invention claimed is:

1. A method comprising:
flowing, by a corrosion inhibitor injection pump, a corrosion inhibitor into a flowline through which hydrocarbons are flowed at a pressure greater than a flowline pressure of the hydrocarbons flowing through the flowline, the corrosion inhibitor configured to inhibit corrosion of the flowline due to the flow of the hydrocarbons;
determining, based on a failure of a rupture disc in a first branch of a flow pathway through which the corrosion inhibitor flows, that a first pressure at which the corrosion inhibitor is flowed into the flowline exceeds a threshold pressure; and
in response to determining that the pressure exceeds the threshold pressure:
ceasing a first flow of the corrosion inhibitor through the first branch,
permitting a second flow of the corrosion inhibitor in a second branch of the flow pathway fluidically isolated from the first branch at a second pressure less than the threshold pressure, and
transmitting one or more electronic alerts to one or more electronic terminals to communicate that the second pressure exceeds the threshold pressure.

2. The method of claim 1, wherein ceasing the flow of the corrosion inhibitor in the first branch comprises changing a first block valve coupled to the first branch from an open state to a closed state.

3. The method of claim 2, wherein permitting the flow of the corrosion inhibitor in the second branch comprises changing a second block valve coupled to the second branch from a closed state to an open state.

4. The method of claim 1, further comprising:
determining that a time between ceasing the flow of the corrosion inhibitor in the first branch and permitting the flow of the corrosion inhibitor in the second branch exceeds a time threshold; and
in response to determining that the time exceeds the time threshold, transmitting a closure signal to an isolation valve upstream of the flowline to cause the isolation valve to cease flow through the flowline.

5. The method of claim 1, further comprising, in response to determining that the first pressure exceeds the threshold pressure, causing the corrosion inhibitor injection pump to flow the corrosion inhibitor at the second pressure less than the threshold pressure.

6. The method of claim 1, further comprising:
sensing a third pressure on the rupture disc in the first branch due to flow of the corrosion inhibitor; and
determining that the rupture disc has failed responsive to drop in the third pressure on the rupture disc.

7. The method of claim 1, wherein the rupture disc is a first rupture disc, wherein the method further comprises sensing a fourth pressure on a second rupture disc in the second branch due to flow of the corrosion inhibitor.

* * * * *